US012632543B2

(12) United States Patent
Choi

(10) Patent No.: US 12,632,543 B2
(45) Date of Patent: May 19, 2026

(54) IDPS DYNAMIC ALLOCATION DEVICE AND METHOD BASED ON RESOURCE USAGE RECOGNITION

(71) Applicants: HYUNDAI MOTOR COMPANY, Seoul (KR); KIA CORPORATION, Seoul (KR)

(72) Inventor: Hakhui Choi, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 186 days.

(21) Appl. No.: 18/538,595

(22) Filed: Dec. 13, 2023

(65) Prior Publication Data

US 2025/0103705 A1     Mar. 27, 2025

(30) Foreign Application Priority Data

Sep. 27, 2023     (KR) ........................ 10-2023-0130725

(51) Int. Cl.
G06F 21/55 (2013.01)
G06F 21/56 (2013.01)

(52) U.S. Cl.
CPC .......... G06F 21/554 (2013.01); G06F 21/552 (2013.01); G06F 21/566 (2013.01)

(58) Field of Classification Search
CPC ..... G06F 21/554; G06F 21/552; G06F 21/566
See application file for complete search history.

(56) References Cited

U.S. PATENT DOCUMENTS

| | | | | | |
|---|---|---|---|---|---|
| 12,139,169 | B2 * | 11/2024 | Galula | ................. | H04W 12/50 |
| 2015/0286820 | A1 * | 10/2015 | Sridhara | ............... | G06F 1/3206 |
| | | | | | 713/320 |
| 2018/0351980 | A1 * | 12/2018 | Galula | ................. | H04W 12/12 |
| 2022/0060490 | A1 * | 2/2022 | Farshteindiker | ...... | G06F 21/552 |
| 2022/0108001 | A1 * | 4/2022 | Nye | ........................ | G06F 21/44 |
| 2023/0224780 | A1 * | 7/2023 | Yang | ..................... | H04W 76/18 |
| | | | | | 370/331 |
| 2024/0054212 | A1 * | 2/2024 | Hu | ........................ | G06F 21/552 |

FOREIGN PATENT DOCUMENTS

WO     WO-2024166104 A1 *     8/2024     .......... G06F 21/552

* cited by examiner

*Primary Examiner* — Linglan Edwards
*Assistant Examiner* — Jacob Benedict Knackstedt
(74) *Attorney, Agent, or Firm* — Lempia Summerfield Katz LLC

(57) ABSTRACT

An Intrusion Detection and Prevention System (IDPS) dynamic allocation device includes a resource amount information receiving unit configured to receive information about resource usage, including Electronic Control Unit (ECU) usage and IDPS usage, from an ECU resource amount measuring module. The IDPS dynamic allocation device also includes a resource usage determining unit configured to determine whether the resource usage exceeds a usage allowance. The IDPS dynamic allocation device further includes a resource usage control unit configured to deactivate at least one detection method to reduce the IDPS usage when the resource usage exceeds the usage allowance. The resource usage control unit is configured to selectively deactivate a detection method that has a lowest priority based on a detection method priority table and has at least one similar detection method.

18 Claims, 6 Drawing Sheets

FIG. 3

| Priority | Detection method (Description) | Function similar group | Average resource usage of detection method | Detection method point |
|---|---|---|---|---|
| 1 | Check CAN message period | 1 | CPU usage(3%), Memory usage(2kB) | 20 |
| 2 | Check CAN message code length | 2 | CPU usage(3%), Memory usage(3kB) | 15 |
| 3 | Check CAN message transmission node address | 3 | CPU usage(4%), Memory usage(2kB) | 10 |
| 4 | Check signal range in CAN message | 4 | CPU usage(2%), Memory usage(1kB) | 5 |
| 5 | Check signal continuity in CAN message | 4 | CPU usage(1%), Memory usage(1kB) | 4 |
| 6 | Check CAN message ID | 5 | CPU usage(1%), Memory usage(1kB) | 3 |
| ... | ... | ... | ... | |
| N | Measure CAN Bus load | K | CPU usage(2%), Memory usage(5kB) | |

IDPS DYNAMIC ALLOCATION DEVICE AND METHOD BASED ON RESOURCE USAGE RECOGNITION

CROSS-REFERENCE TO RELATED APPLICATION

This application claims the benefit of and priority to Korean Patent Application No. 10-2023-0130725, filed in the Korean Intellectual Property Office on Sep. 27, 2023, the entire contents of which are incorporated herein by reference.

TECHNICAL FIELD

The present disclosure relates to an Intrusion Detection and Prevention System (IDPS) dynamic allocation device and method based on resource usage recognition.

BACKGROUND

In future mobility, a vehicle's Controller Area Network (CAN) is connected to an external network to provide convenience to users of a vehicle. However, this external network connection may also be used as an intrusion pathway for hackers to disrupt the normal operation of the vehicle. To prevent such intrusions, the United Nations created a regulation known as the Type Approval for Cybersecurity and Cybersecurity Management Systems, which is applied only to new vehicles sold in Europe by 2024. Automotive original equipment manufacturers (OEMs) are adapting IDPS modules used in Ethernet communication networks to vehicles to meet the communication requirements of the corresponding regulations.

The IDPS module is a type of firewall that detects abnormal CAN messages received from the external network and prevents abnormal operation of the system. However, the IDPS module has the inherent property of running continuously in the background, consuming a large amount of the ECU's resources (e.g., central processing unit (CPU) usage, memory usage, etc.). In systems that need to use limited ECU resources, the ECU resources consumed for the performance of IDPS functions may degrade the performance of the fundamental ECU system.

SUMMARY

Embodiments of the present disclosure provide an Intrusion Detection and Prevention System (IDPS) dynamic allocation device and method based on resource usage recognition. Embodiments of the present disclosure dynamically activate or deactivate a detection method of an IDPS based on real-time measured resource usage of an Electronic Control Unit (ECU).

Embodiments of the present disclosure provide an Intrusion Detection and Prevention System (IDPS) dynamic allocation device and method performed based on resource usage recognition. The IDPS dynamic allocation device and method monitor resource usage of an ECU (e.g., central processing unit (CPU) usage, memory usage, etc.), including resource usage used for a main function of the ECU and resource usage used for IDPS, and selectively reduce the function (e.g., detection method) of an IDPS module when the ECU resource usage exceeds a total resource usage allowance, to enable the main function of the ECU to be stably performed.

According to an embodiment of the present disclosure, an IDPS dynamic allocation device is provided. The IDPS dynamic allocation device includes a resource amount information receiving unit configured to receive information about resource usage, including Electronic Control Unit (ECU) usage and IDPS usage, from an ECU resource amount measuring module. The IDPS dynamic allocation device also includes a resource usage determining unit configured to determine whether the resource usage exceeds a usage allowance. The IDPS dynamic allocation device additionally includes a resource usage control unit configured to deactivate at least one detection method to reduce the IDPS usage when the resource usage exceeds the usage allowance. The resource usage control unit is configured to selectively deactivate a detection method that has a lowest priority based on a detection method priority table and has at least one similar detection method.

The resource usage control unit may be configured to, when the resource usage is less than the usage allowance, reactivate one or more deactivated detection methods to increase the IDPS usage within the usage allowance.

The resource usage control unit may be configured to first activate a deactivated detection method having a highest priority among the one or more deactivated detection methods.

The detection method priority table may include a description of each of a plurality of detection methods obtained from a detection method definition document.

The detection method priority table may include a priority determined based on a point assigned to each of the plurality of detection methods based on the description of each of the plurality of detection methods. The detection method priority table may also include a plurality of similar groups including similar detection methods among the plurality of detection methods. The detection method priority table may additionally include average resource usage for each of the plurality of detection methods.

In an embodiment, the IDPS dynamic allocation device may further include an IDPS function performing unit configured to detect, in CAN messages transmitted to or received from a CAN driver, abnormal messages that violate detection methods included in the detection method priority table. The IDPS function performing unit may also be configured to drop the detected abnormal messages.

The IDPS function performing unit may be configured to adjust a priority associated with a particular detection method, among the plurality of detection methods, violated by an abnormal message, by additionally assigning a point to the particular detection method.

The resource usage control unit may be configured to reflect the priority adjusted by the IDPS function performing unit to the detection method priority table in real time to update the detection method priority table. The resource usage control unit may also be configured to control the resource usage based on the updated detection method priority table.

The resource usage control unit may be configured to set a detection method that overlaps an item for checking a CAN message in Basic Software (BSW) to have the lowest priority when the basic software is written in AUTOSAR.

The resource usage control unit may be configured to, when the detection method having the lowest priority in the detection method priority table does not have at least one similar detection method, select and deactivate a detection method having a lowest priority from among detection methods that have at least one similar detection method.

According to another embodiment of the present disclosure, an IDPS dynamic allocation method is provided. The IDPS dynamic allocation method includes receiving information about resource usage, including Electronic Control Unit (ECU) usage and IDPS usage, from an ECU resource amount measuring module. The IDPS dynamic allocation method also includes determining whether the resource usage exceeds a usage allowance. The IDPS dynamic allocation method additionally includes, when the resource usage exceeds the usage allowance, selectively deactivating a detection method that has a lowest priority based on a detection method priority table and has at least one similar detection method to reduce the IDPS usage.

The IDPS dynamic allocation method may further include, when the resource usage is less than the usage allowance, activating one or more deactivated detection methods to increase the IDPS usage within the usage allowance.

Activating of the one or more deactivated detection methods may include first activating a deactivated detection method having a highest priority among the one or more deactivated detection method.

Selectively deactivating the detection method may include managing and updating the detection method priority table for a plurality of detection methods based on a detection method definition document.

Managing and updating the detection method priority table may include calculating and updating, in real time, a point for each of the plurality of detection methods based on a description of each of the plurality of detection methods. Managing and updating the detection method priority table may also include grouping similar detection methods among the plurality of detection methods as a similar group. Managing and updating the detection method priority table may further include setting average resource usage for each of the plurality of detection methods.

In an embodiment, the IDPS dynamic allocation method may further include detecting, in CAN messages transmitted to or received from a CAN driver, abnormal messages that violate detection methods included in the detection method priority table. The IDPS dynamic allocation method may also include dropping the detected abnormal messages.

The IDPS dynamic allocation method may further include adjusting a priority associated with a particular detection method, among the plurality of detection methods, violated by an abnormal message, by additionally assigning a point to the particular detection method.

The IDPS dynamic allocation method may further include reflecting the adjusted priority to the detection method priority table, in real time, to update the detection method priority table. The IDPS dynamic allocation method may also include selecting a detection method to be deactivated based on the updated detection method priority table.

The IDPS dynamic allocation method may further include setting a detection method that overlaps an item for checking a CAN message in Basic Software (BSW) to have the lowest priority when the basic software is written in AUTOSAR.

The IDPS dynamic allocation method may further include, when the detection method having the lowest priority does not have at least one similar detection method, determining whether a detection method having a next lowest priority has at least one similar detection method. The IDPS dynamic allocation method may also include selecting and deactivating the detection method having a lowest priority from among the detection methods that have at least one similar detection method.

The IDPS dynamic allocation device and method based on resource usage recognition according to embodiments of the present disclosure may dynamically activate or deactivate a detection method of an IDPS based on real-time measured resource usage of an ECU.

The IDPS dynamic allocation device and method based on resource usage recognition according to embodiments of the present disclosure may monitor resource usage of an ECU (CPU, memory usage), including resource usage used for a main function of the ECU and resource usage used for IDPS, and selectively reduce the function (detection method) of an IDPS module when the ECU resource usage exceeds a total resource usage allowance, to enable the main function of the ECU to be stably performed.

BRIEF DESCRIPTION OF THE DRAWINGS

FIG. 3 is a detection method priority table, according to an embodiment of the present disclosure.

DETAILED DESCRIPTION

Figure 1:
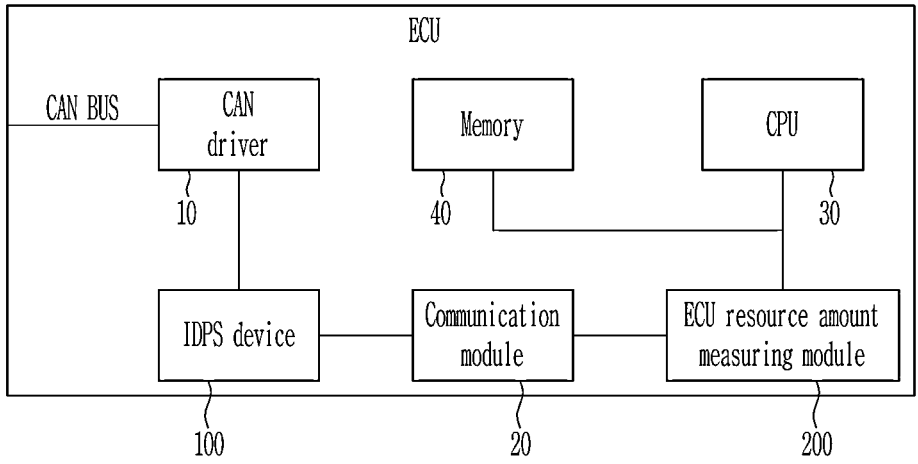
FIG. 1 is a diagram schematically illustrating an ECU including an Intrusion Detection and Prevention System (IDPS) dynamic allocation device based on resource usage recognition, according to an embodiment of the present disclosure.

Hereinafter, embodiments of the present disclosure are described in detail with reference to the accompanying drawings in which exemple embodiments of the present disclosure are shown. As those having ordinary skill in the art should realize, the described embodiments may be modified in various different ways without departing from the spirit or scope of the present disclosure. Accordingly, the drawings and description should be regarded as illustrative in nature and not restrictive. Like reference numerals designate like elements throughout the specification.

Throughout the specification and claims, unless explicitly described to the contrary, the word "comprise", and variations such as "comprises" or "comprising", should be understood to imply the inclusion of stated elements but not the exclusion of any other elements. Terms including an ordinary number, such as "first" and "second", are used for describing various constituent elements, but the constituent elements are not limited by the terms. The terms are used only to distinguish one constituent element from another constituent element.

Terms such as "part," "unit," "module," and the like in the specification may refer to a unit capable of performing at least one function or operation described herein, which may be implemented in hardware or circuitry, software, or a combination of hardware or circuitry and software.

When a component, device, element, or the like of the present disclosure is described as having a purpose or performing an operation, function, or the like, the component, device, or element should be considered herein as being "configured to" meet that purpose or perform that operation or function.

An Electronic Control Unit (ECU) is an electronic control module that controls various systems and functions of a vehicle. There may be multiple ECUs in a vehicle, and each ECU may be responsible for controlling and monitoring a specific function or system. Examples of the ECU include an engine control unit, a brake control unit, and a transmission control unit. The ECUs may collect data from sensors, and may control actuators based on algorithms to perform specific functions in the vehicle.

The ECU and an Intrusion Detection and Prevention System (IDPS) are critical components in the vehicle and IT security, respectively. Modern vehicles are becoming increasingly connected, so the security of ECUs is also an important issue.

Generally, modern vehicles are connected to a variety of external systems, such as smartphones, navigation, the internet, and cloud services. While this connectivity provides new functions and services, it may also increase security threats from the outside. A malicious attacker could attempt to hack into the ECU of a connected vehicle, and a successful attack could have serious consequences.

To protect the ECU of the vehicle, abnormal traffic or activity may be detected and responded to by IDPSs integrated within the vehicle network. The IDPS detects threats, such as unauthorized access attempts to ECUs, malicious code transmission, and data tampering, in real time and either blocks the threats or alerts administrators via notification. Because vehicle environments are different from traditional IT networks, a vehicle-specific IDPS is required. In other words, since the vehicle is a real-time reactive system, the IDPS should not cause too much overhead. Therefore, a system that is efficient and ensures fast response is required.

FIG. 1 is a diagram schematically illustrating an ECU including an IDPS dynamic allocation device based on resource usage recognition, according to an embodiment of the present disclosure.

Referring to FIG. 1, an ECU of a vehicle includes a CAN driver 10, a communication module 20, a CPU 30, a memory 40, an IDPS dynamic allocation device 100 that may perform allocation based on resource usage recognition, and an ECU resource amount measuring module 200.

The CAN driver 10 may transmit and receive CAN messages. The CAN driver 10 mediates and controls the communication between the ECU application and the CAN network. The CAN driver 10 serves as an interface between an application layer of the ECU and the CAN hardware. The CAN driver 10 handles the task of transmitting or receiving CAN messages through the interface.

For example, when the ECU wishes to transmit a message through the CAN driver 10, the CAN driver 10 converts the corresponding message into a CAN message according to the CAN protocol format and transmits the converted CAN message to the CAN controller. The CAN controller then transmits the converted message to a CAN BUS.

Conversely, when the ECU attempts to receive a message through the CAN driver 10, and the CAN driver 10 receives the message through the CAN bus, the CAN driver 10 converts the message into a properly formatted CAN message before transmitting the message to the ECU application layer.

The communication module 20 may be responsible for interfacing between the CAN driver 10 and the CPU 30. The communication module 20 may manage communications for the ECUs to exchange information and interact with each other while communicating with each other.

The CPU 30 is a central processing unit of the ECU. The CPU 30 acts as the brain of the ECU and performs various computational and data processing tasks. The CPU 30 processes data coming into the ECU from various sensors in real time. The CPU 30 receives and processes the data, and generates an appropriate response. The CPU 30 may be configured in the form of a microcontroller (MCU). That is, the CPU 30 may be configured as an MCU in a small package with integrated RAM, ROM, timers, I/O ports, and the like. There may be multiple CPUs 30 in the ECU.

The memory 40 may include a Random Access Memory (RAM) and an Electrically Erasable Programmable Read-Only Memory (EEPROM). The memory 40 stores the data that the ECU continuously collects from the sensors for computation and control. The memory 40 may update or modify the software of the ECU via the EEPROM. There may be multiple memories 40 in the ECU.

The ECU resource amount measuring module 200 is a module that measures the resource usage being used by the ECU. The ECU resource amount measuring module 200 may measure and monitor how much of the CPU 30 is being used by programs or tasks running on the ECU. The ECU resource amount measuring module 200 may measure the usage of the memory 40. The ECU resource amount measuring module 200 may measure the resource usage of the ECU based on the usage of the CPU 30 and the memory 40 of each module or device.

The ECU resource amount measuring module 200 may measure and monitor ECU usage and IDPS usage, among the ECU resource amount. The ECU usage may correspond to the amount of resources used for the main function of the ECU, such as the automotive electronic control function. The IDPS usage may correspond to the amount of resources used by the IDPS device to perform IDPS functions inside the ECU.

The ECU resource amount measuring module 200 may receive information about the ECU usage from each module of the ECU. The ECU resource amount measuring module 200 may also receive information about the IDPS usage according to the resource amount table from the IDPS device. The ECU resource amount measuring module 200 may thus monitor the ECU usage and the IDPS usage.

The IDPS dynamic allocation device (hereinafter, the IDPS device) 100 performs allocation based on resource usage recognition. The IDPS device detects and processes abnormal messages among CAN messages transmitted and received by the CAN driver 10. The IDPS device 100 performs the IDPS function for the ECU and dynamically controls the reduction/expansion of the detection function to control the amount of resources used for the IDPS.

The IDPS device 100 detects and responds to abnormal traffic or activity within the vehicle network. The IDPS device 100 may detect threats, such as unauthorized access attempts to the ECU, malicious code transmission, and data tampering, in real time, and may block the threats or alert the administrator of the threats through notification.

Figure 2:
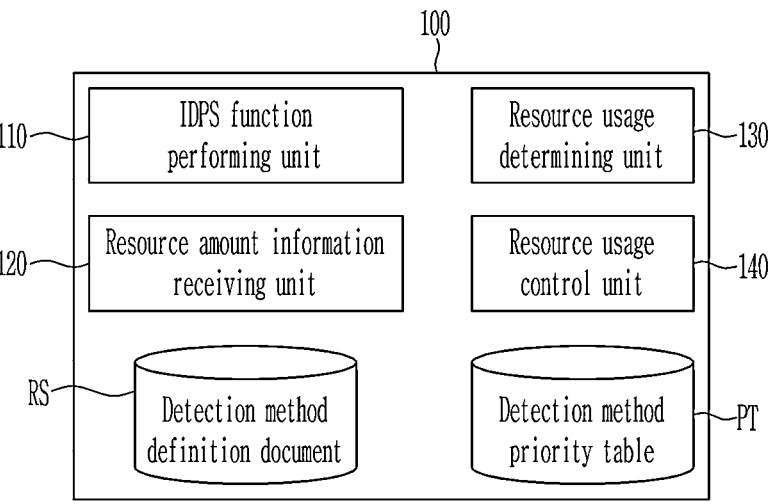
FIG. 2 is a block diagram illustrating an IDPS dynamic allocation device based on resource usage recognition, according to an embodiment of the present disclosure.

FIG. 2 is a block diagram illustrating the IDPS dynamic allocation device based on resource usage recognition, according to an embodiment of the present disclosure.

Referring to FIG. 2, the IDPS dynamic allocation device (e.g., the IDPS device 100, hereinafter, "the IDPS device") may perform allocation based on resource usage recognition. The IDPS device 100 may include an IDPS function performing unit 110, a resource amount information receiving unit 120, a resource usage determining unit 130, a resource usage control unit 140, a detection method definition document RS, and a detection method priority table PT.

The detection method definition document RS includes definitions for multiple IDPS detection methods. The detection method definition document RS includes a description for each of a plurality of detection methods. IDPS relies on rules (or signatures) to detect and prevent potentially malicious activity. These rules may define patterns or behaviors that indicate known threats or potential security violation. The detection method definition document RS includes a ruleset of these rules for a plurality of detection methods.

The detection method priority table PT is a table that prioritizes multiple detection methods. The IDPS is generally an intrusion detection and prevention system. The detection method priority table PT may be a table that lists, in order of priority, multiple detection methods that the IDPS uses to detect intrusions for security purposes. The detection method priority table PT may include a description of each of the plurality of detection methods input via the detection method definition document.

Here, the priority may be an indicator of the importance of a detection method. A higher priority may mean that the detection method is more important. Priority may be determined based on the point of each detection method. The point may be determined based on the description of the detection method provided in the detection method definition document RS. For example, the point may be a preset value based on the description of the detection method. A higher point indicates a higher priority and more important detection method. The point and resulting priority may be updated in real time.

The detection method priority table PT may include a point, description, and average resource usage for each of the plurality of detection methods, as well as a priority. The detection method priority table PT may define two or more detection methods, among the plurality of detection methods, that are similar to each other as similar detection methods. Similar detection methods may be grouped into a functional similarity group. The detection method priority table PT may include a plurality of functional similarity groups.

The IDPS function performing unit 110 may detect, among the CAN messages transmitted to and received from the CAN driver, abnormal messages that violate the detection method included in the detection method priority table. The IDPS function performing unit 110 may drop the detected abnormal message.

Accordingly, the IDPS function performing unit 110 may perform the abnormal message detection and processing functions of the IDPS for ECU security.

The IDPS function performing unit 110 may additionally assign points for a specific detection method among the plurality of detection methods that the abnormal message violated. For example, the IDPS function performing unit 110 may adjust the priority to be higher by assigning an extra point to the specific detection method that detects the abnormal message.

The resource amount information receiving unit 120 may receive information about resource usage, including ECU usage and IDPS usage, from the ECU resource amount measuring module 200 (see FIG. 1). The resource usage means the total usage of the resources of the ECU. In other words, the resource usage is the usage including ECU usage used for ECU main functions and IDPS usage used for IDPS functions and dynamic allocation functions. The resources of the ECU may include the resources of the CPU 30 (see FIG. 1) and the resources of the memory 40 (see FIG. 1). The IDPS usage may include CPU usage and memory usage of the IDPS device.

The resource amount information receiving unit 120 may receive information that includes the total amount of resources of the ECU, a usage allowance that defines a usage limit in the total amount of resources, ECU usage, and IDPS usage from the ECU resource amount measuring module 200.

The resource usage determining unit 130 may determine (e.g., check) whether the resource usage exceeds the usage allowance. The resource usage determining unit 130 may receive resource amount information from the resource amount information receiving unit 120. The resource usage determining unit 130 may determine, based on the received resource amount information, whether the total resource usage is appropriately represented in the range of the predefined usage allowance. In an example, the resource usage determining unit 130 determines whether the resource usage exceeds the usage allowance or whether the resource usage falls short of the usage allowance. For example, the usage allowance may be 70% of the total resource amount.

The resource usage control unit 140 may deactivate at least one detection method to reduce IDPS usage when the resource usage exceeds the usage allowance. As such, the resource usage control unit 140 does not regulate ECU usage. The resource usage control unit 140 controls the total resource usage by reducing the IDPS usage. The resource usage control unit 140 deactivates at least one of the plurality of detection methods to regulate the resource usage to within the usage allowance.

The resource usage control unit 140 may selectively deactivate detection methods that have the lowest priority and at least one similar detection method based on the detection method priority table.

When the detection method having the lowest priority in the detection method priority table does not have at least one similar detection method, the resource usage control unit 140 may select and deactivate the detection method having the lowest priority from among the detection methods that have at least one similar detection method.

The resource usage control unit 140 may deactivate a second detection method between a first detection method that has the lowest priority and no similar detection method and the second detection method that has the second lowest priority and similar detection method. For example, the resource usage control unit 140 may select a specific detection method that satisfies a first condition of having a low priority and a second condition of having one or more similar detection methods and deactivate the selected specific detection method first. Accordingly, the resource usage control unit 140 first deactivates a detection method, from among the detection methods having low importance, that may be replaced.

When the resource usage is less than the usage allowance, the resource usage control unit 140 may reactivate the at least one deactivated detection method to increase IDPS usage within the usage allowance. Accordingly, the resource usage control unit 140 may optimize the functions of the ECU and the IDPS by ensuring that the total resources are used to the maximum within the usage allowance.

The resource usage control unit 140 may activate the detection method having the highest priority among the at least one deactivated detection method.

The resource usage control unit 140 may update the detection method priority table in real time by reflecting the priorities adjusted by the IDPS function performing unit 110 to the detection method priority table, and control the resource usage based on the latest updated detection method priority table.

The resource usage control unit 140 may determine (e.g., check) whether the detection method priority table has been updated before activating or deactivating the detection methods based on the priority. The resource usage control unit 140 may selectively activate or deactivate the detection methods by applying the latest version of the detection method priority table.

The resource usage control unit 140 may set a detection method that overlaps an item for checking the CAN message in the Basic Software (BSW) of AUTomotive Open System Architecture (AUTOSAR) to have the lowest priority when the basic software is written in AUTOSAR.

AUTOSAR or AUTomotive Open System Architecture@@@is an automotive platform standardized to respond to the rapid growth of embedded use for vehicle electronic components. The official name is the Open Automotive Standards Software Architecture, often abbreviated as AUTOSAR.

In an example, the resource usage control unit 140 may first deactivate specific detection methods that may be replaced by AUTOSAR's basic software.

FIG. 3 is a detection method priority table, according to an embodiment of the present disclosure.

According to the detection method priority table in FIG. 3, the detection methods are, depending on the description, checking the CAN message period, checking the CAN message code length, checking a CAN message transmission node address, checking the signal range in the CAN message, checking the signal continuity in the CAN message, checking the CAN message ID, and measuring the CAN bus load.

In the detection method priority table, the above detection methods may be listed in order of priority. Each of the detection methods may be specified to any one of the plurality of functional similarity groups defined by 1 to K.

In the detection method priority table, it can be seen that the detection methods are prioritized in order of highest detection method point. The average resource usage for the detection method is shown including both CPU usage and memory usage.

In FIG. 3, it can be seen that, among the detection methods, the detection method for checking the signal range in CAN messages with priority 4 (detection method 4) and the detection method for checking the signal continuity in CAN messages with priority 5 (detection method 5) belong to the same functional similarity group 4.

Among the detection methods, the detection method for checking the CAN message ID of priority 6 has the lowest priority among the current priorities 1 to 6 (except priority N). The detection method for checking the CAN message ID of priority 6 (detection method 6), however, correspond to the only detection method belonging to the functional similarity group 5.

Figure 4:
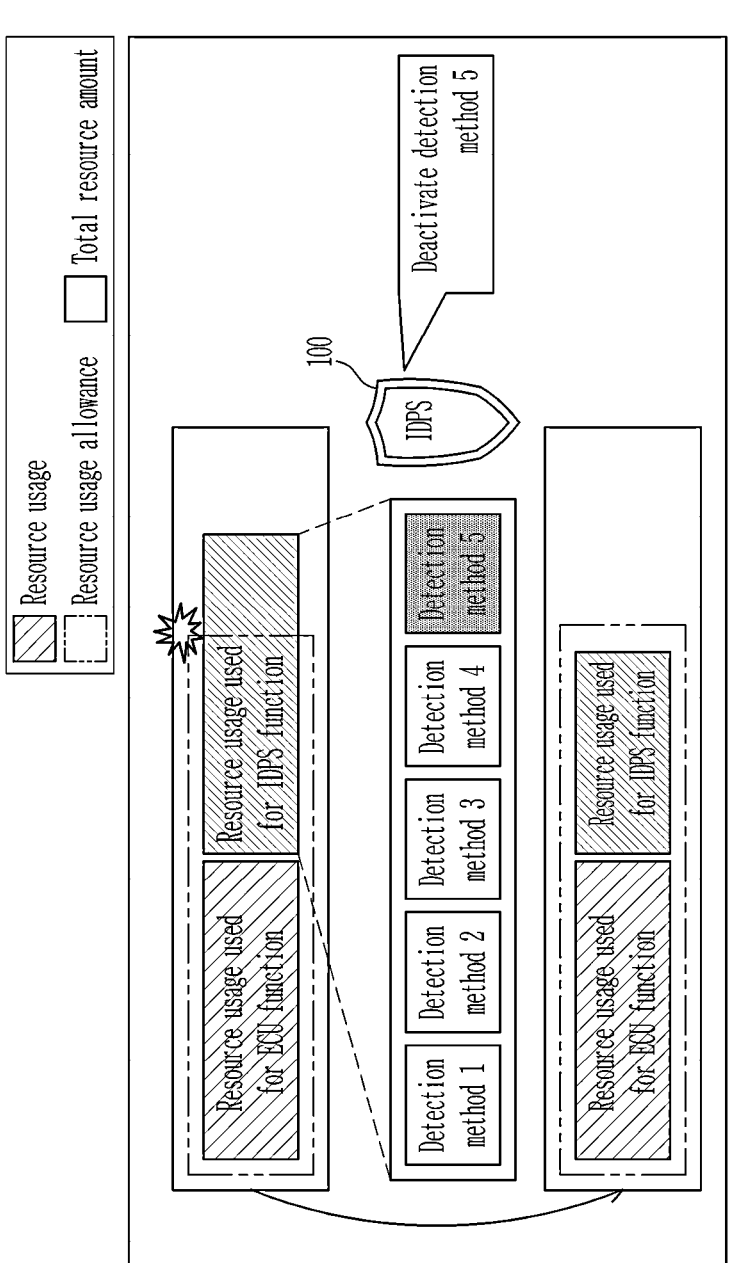
FIG. 4 is a diagram of an example IDPS dynamic allocation method based on resource usage recognition based on the table of FIG. 3, according to an embodiment of the present disclosure.

FIG. 4 is a diagram of an example of an IDPS dynamic allocation method based on resource usage recognition based on the table of FIG. 3, according to an embodiment of the present disclosure. The IDPS dynamic allocation method is described with reference to FIGS. 2 and 3.

The IDPS dynamic allocation device 100 may control resource usage based on resource usage recognition via the resource usage control unit 140. When the resource usage exceeds a resource usage allowance, the resource usage control unit 140 may deactivate a specific detection method that has the lower priority and at least one similar detection method among the plurality of detection methods.

Referring to FIGS. 3 and 4, the resource usage control unit 140 deactivates detection method 5 (that is, the detection method with priority 5) among the plurality of detection methods when the resource usage including the resource usage used for the ECU function and the resource usage used for the IDPS exceeds the resource usage allowance. In FIG. 3, detection method 5 has a higher priority than detection method 6. However, detection method 5 includes detection method 4 of specified functional similarity group 4. Accordingly, detection method 5 may be replaced by detection method 4. Thus, detection method 5 may be deactivated first before other detection methods including detection method 6.

In FIG. 4, when detection method 5 is deactivated, it can be seen that the resource usage does not exceed the resource usage allowance.

Figure 5:
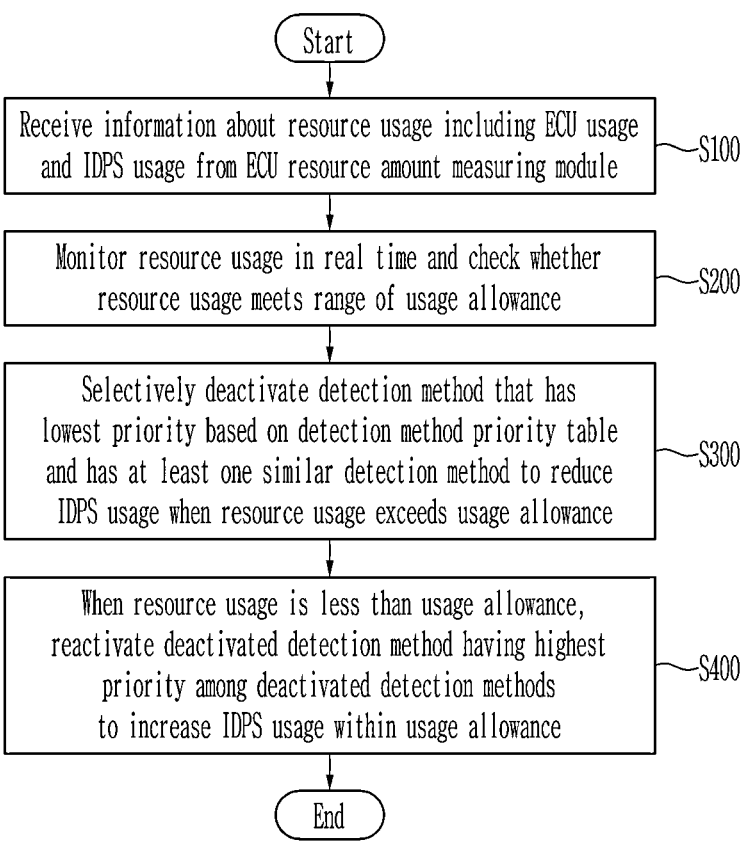
FIG. 5 is a flowchart of an IDPS dynamic allocation method based on resource usage recognition, according to an embodiment of the present disclosure.

FIG. 5 is a flowchart of an IDPS dynamic allocation method based on resource usage recognition, according to an embodiment of the present disclosure. The IDPS dynamic allocation method based on resource usage recognition of FIG. 5 may be performed by the IDPS dynamic allocation device 100 (see FIG. 2).

In an operation S100, the IDPS dynamic allocation device 100 may receive information about resource usage including ECU usage and IDPS usage from the ECU resource amount measuring module. The ECU resource amount measuring module 200 (see FIG. 1) measures ECU usage and IDPS usage in real time.

In an operation S200, the IDPS dynamic allocation device 100 may monitor the resource usage in real time, and may determine (e.g., check) whether the resource usage meets a range of usage allowance.

In an operation S300, the IDPS dynamic allocation device 100 may selectively deactivate a detection method that has the lowest priority based on a detection method priority table and has at least one similar detection method to reduce IDPS usage when the resource usage exceeds the usage allowance (operation S300).

In an operation S400, when the resource usage is less than the usage allowance, the IDPS dynamic allocation device 100 based on resource usage recognition may reactivate the deactivated detection method having the highest priority among the deactivated detection methods to increase IDPS usage within the usage allowance.

Figure 6:
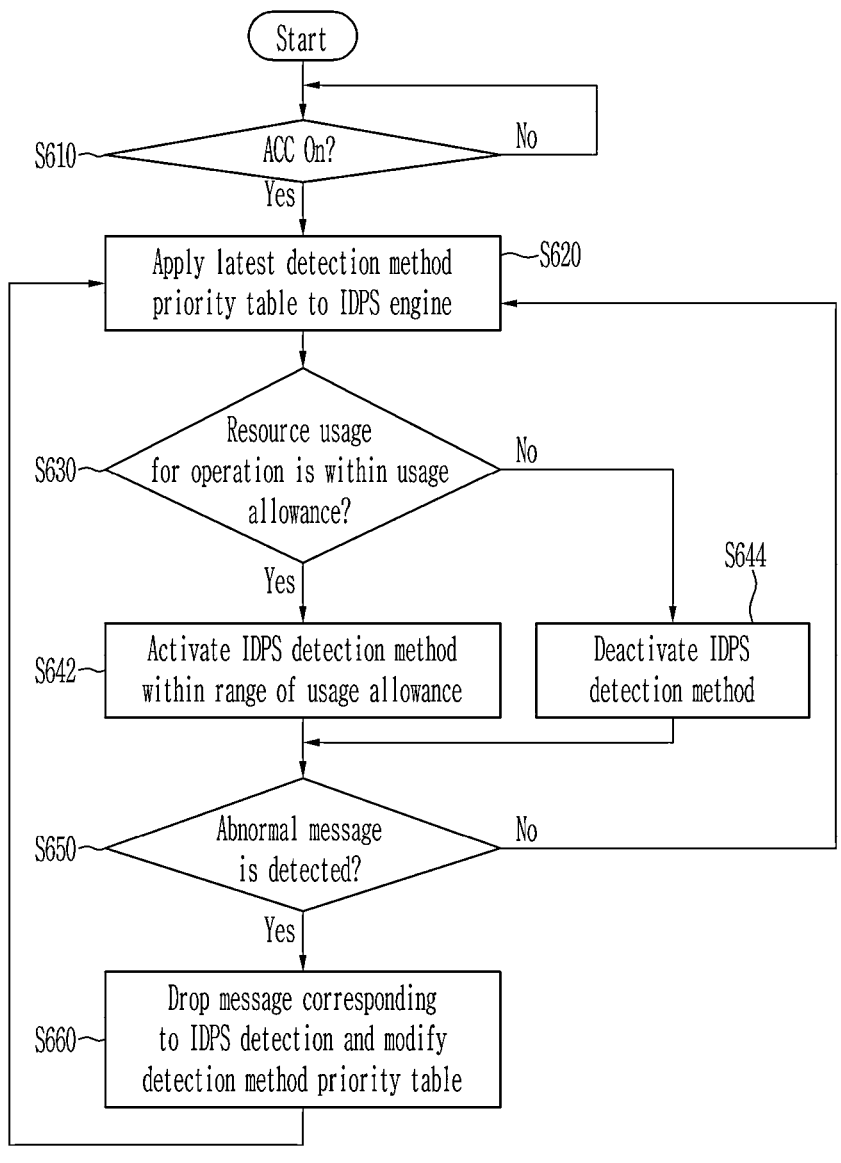
FIG. 6 is a flowchart of an IDPS dynamic allocation method based on resource usage recognition, according to another embodiment of the present disclosure.

FIG. 6 is a flow diagram of an IDPS dynamic allocation method based on resource usage recognition, according to another embodiment of the present disclosure. The IDPS dynamic allocation method based on resource usage recognition of FIG. 6 may be performed by the IDPS dynamic allocation device 100 (see FIG. 2).

In an operation S610, the IDPS dynamic allocation device 100 determines whether the ACC is on.

In an operation S620, the IDPS dynamic allocation device 100 may apply the latest updated detection method priority table when the ACC is On or higher.

In an example, the IDPS dynamic allocation device 100 may be operated by loading a default or previously stored IDPS ruleset or the detection method definition document RS (see FIG. 2) and the detection method priority table PT (see FIG. 2).

In an embodiment, the IDPS dynamic allocation device 100 may manage and update the detection method priority table PT in which the plurality of detection methods is input through the detection method definition document RS. In an example, the IDPS dynamic allocation device 100 may update the priorities of the detection methods in the detection method priority table PT in real time.

The IDPS dynamic allocation device 100 may calculate a point for each of the plurality of detection methods based on a description of each of the plurality of detection methods. The IDPS dynamic allocation device 100 may update the point in real time. The IDPS dynamic allocation device 100 may reflect the updated point to the priority in real time.

In an embodiment, the IDPS dynamic allocation device 100 may set a detection method that overlaps an item for checking the CAN message in the Basic Software (BSW) of AUTomotive Open System Architecture (AUTOSAR) to have the lowest priority when the basic software is written in AUTOSAR.

The IDPS dynamic allocation device 100 may group the similar detection methods among the plurality of detection methods into a similar group. For example, the IDPS dynamic allocation device 100 based on resource usage recognition may group similar detection methods that are determined to be replaced with each other into the same functional similarity group.

The IDPS dynamic allocation device 100 may set an average resource usage for each of the plurality of detection methods. The IDPS dynamic allocation device 100 may calculate IDPS usage based on the set average resource usage.

In an operation S630, the IDPS dynamic allocation device 100 may determine (e.g., check) whether the IDPS resource usage used for operations to perform IDPS functions is within a range of usage allowance.

In an operation S644, when the resource usage in use exceeds the usage allowance, the IDPS dynamic allocation device 100 may deactivate the at least one IDPS detection method by referring to the detection method priority table PT.

The IDPS dynamic allocation device 100 may selectively deactivate detection methods that have the lowest priority and at least one similar detection method based on the detection method priority table.

When the functional similarity group to which the detection method having the lowest priority belongs includes only the detection method, the IDPS dynamic allocation device 100 may check whether the functional similarity group to which the detection method having the next lowest priority belongs includes multiple detection methods. In other words, when the detection method having the lowest priority does not have at least one similar detection method, the IDPS dynamic allocation device 100 may check whether the detection method having the next lowest priority has at least one similar detection method.

The IDPS dynamic allocation device 100 may select and deactivate the detection method having the lowest priority among detection methods having at least one similar detection method.

In an operation S642, when the resource usage is less than the usage allowance, the IDPS dynamic allocation device 100 may reactivate the detection method that was deactivated within the range of the usage allowance. Thus, the IDPS dynamic allocation device 100 does not regulate the ECU usage for performing ECU functions out of the resource usage. Instead, the IDPS dynamic allocation device 100 may control the IDPS usage used for IDPS functions to ensure that sufficient ECU usage is available to perform ECU functions.

The IDPS dynamic allocation device 100 may activate the detection method having the highest priority among the at least one detection method that has been deactivated.

In an operation S650, the IDPS dynamic allocation device 100 may detect whether there is an abnormal message that violates any one of the plurality of detection methods included in the detection method priority table, among the CAN messages transmitted to or received from the CAN driver.

When no abnormal messages are detected, the IDPS dynamic allocation device 100 may perform real-time control of resource usage with a pre-calculated priority.

In an operation S660, when the abnormal message is detected, the IDPS dynamic allocation device 100 may drop and remove the detected abnormal message. In an operation S660, the IDPS dynamic allocation device 100 may additionally assign a point to the specific detection method violated by the dropped abnormal message and modifies the priority.

In an operation S620, the IDPS dynamic allocation device 100 may perform an update to reflect the detection method priority table in which the priority has been modified as the latest detection method priority table, and may apply the updated latest detection method priority table in controlling resource usage. Thereafter, the IDPS dynamic allocation device 100 may activate or deactivate the detection methods in real time based on the updated latest detection method priority table.

Although the above embodiments of the present disclosure have been described in detail, the scope of the present disclosure is not limited thereto. Rather, the scope of the present disclosure also includes various modifications and improvements that may be made by one having ordinary skill in the art utilizing the basic concepts of the present disclosure as defined in the following claims.

DESCRIPTION OF SYMBOLS

10: CAN driver
20: Communication module
30: CPU
40: Memory
100: IDPS device
110: IDPS function performing unit
120: Resource amount information receiving unit
130: Resource usage determining unit
140: Resource usage control unit
200: ECU resource amount measuring module

What is claimed is:

1. An Intrusion Detection and Prevention System (IDPS) dynamic allocation device, comprising:

a resource amount information receiving unit configured to receive information about resource usage, including Electronic Control Unit (ECU) usage and IDPS usage, from an ECU resource amount measuring module;

a resource usage determining unit configured to determine whether the resource usage exceeds a usage allowance; and a resource usage control unit configured to deactivate at least one detection method to reduce the IDPS usage when the resource usage exceeds the usage allowance, wherein the resource usage control unit is configured to selectively deactivate a detection method that i) has a lowest priority based on a detection method priority table and ii) has at least one similar detection method, and wherein the resource usage control unit is further configured to, when the detection method having the lowest priority in the detection method priority table does not have at least one similar detection method, select and deactivate a detection method having a lowest priority from among the detection methods, in the detection method priority table, that have at least one similar detection method.

2. The IDPS dynamic allocation device of claim 1, wherein the resource usage control unit is configured to, when the resource usage is less than the usage allowance, reactivate one or more deactivated detection methods to increase the IDPS usage within the usage allowance.

3. The IDPS dynamic allocation device of claim 2, wherein the resource usage control unit is configured to first activate a deactivated detection method having a highest priority among the one or more deactivated detection methods.

4. The IDPS dynamic allocation device of claim 1, wherein the detection method priority table includes a description of each of a plurality of detection methods, wherein the description is obtained from a detection method definition document.

5. The IDPS dynamic allocation device of claim 4, wherein:

the detection method priority table includes a priority determined based on a point assigned to each of the plurality of detection methods based on the description of each of the plurality of detection methods, a plurality of similar groups including similar detection methods among the plurality of detection methods, and average resource usage for each of the plurality of detection methods.

6. The IDPS dynamic allocation device of claim 5, further comprising:

an IDPS function performing unit configured to detect, in Controller Area Network (CAN) messages transmitted to or received from a CAN driver, abnormal messages that violate detection methods included in the detection method priority table, and drop the detected abnormal messages.

7. The IDPS dynamic allocation device of claim 6, wherein the IDPS function performing unit is configured to adjust a priority associated with a particular detection method, among the plurality of detection methods, violated by an abnormal message, by additionally assigning a point to the particular detection method.

8. The IDPS dynamic allocation device of claim 7, wherein the resource usage control unit is configured to:

reflect the priority adjusted by the IDPS function performing unit to the detection method priority table in real time to update the detection method priority table, and control the resource usage based on the updated detection method priority table.

9. The IDPS dynamic allocation device of claim 1, wherein the resource usage control unit is configured to set a detection method that performs the same checking function as an item for checking a Controller Area Network (CAN) message in Basic Software (BSW) to have the lowest priority when the basic software is written in AUTOSAR.

10. An Intrusion Detection and Prevention System (IDPS) dynamic allocation method, comprising:

receiving information about resource usage, including Electronic Control Unit (ECU) usage and IDPS usage, from an ECU resource amount measuring module;

determining whether the resource usage exceeds a usage allowance; and when the resource usage exceeds the usage allowance, selectively deactivating a detection method that i) has a lowest priority based on a detection method priority table and ii) has at least one similar detection method to reduce the IDPS usage, and wherein selectively deactivating the detection method includes:

when the detection method having the lowest priority does not have at least one similar detection method, determining whether a detection method having the next lowest priority has at least one similar detection method; and selecting and deactivating the detection method having the lowest priority from among the detection methods that have at least one similar detection method.

11. The IDPS dynamic allocation method of claim 10, further comprising, when the resource usage is less than the usage allowance, activating one or more deactivated detection methods to increase the IDPS usage within the usage allowance.

12. The IDPS dynamic allocation method of claim 11, wherein activating the one or more deactivated detection methods includes first activating a deactivated detection method having a highest priority among the one or more deactivated detection methods.

13. The IDPS dynamic allocation method of claim 10, wherein selectively deactivating the detection method includes managing and updating the detection method priority table for a plurality of detection methods based on a detection method definition document.

14. The IDPS dynamic allocation method of claim 13, wherein managing and updating the detection method priority table includes:

calculating and updating, in real time, a point for each of the plurality of detection methods based on a description of each of the plurality of detection methods, grouping similar detection methods among the plurality of detection methods as a similar group, and setting average resource usage for each of the plurality of detection methods.

15. The IDPS dynamic allocation method of claim 14, further comprising:

detecting, in Controller Area Network (CAN) messages transmitted to or received from a CAN driver, abnormal messages that violate detection methods included in the detection method priority table, and dropping the detected abnormal messages.

16. The IDPS dynamic allocation method of claim 15, further comprising adjusting a priority associated with a particular detection method, among the plurality of detection methods, violated by an abnormal message, by additionally assigning a point to the particular detection method.

17. The IDPS dynamic allocation method of claim 16, further comprising:

reflecting the adjusted priority to the detection method priority table in real time to update the detection method priority table, and selecting a detection method to be deactivated based on the updated detection method priority table.

18. The IDPS dynamic allocation method of claim 10, further comprising setting a detection method that performs the same checking function as an item for checking a Controller Area Network (CAN) message in Basic Software (BSW) to have the lowest priority when the basic software is written in AUTOSAR.

* * * * *